(12) United States Patent
Jain et al.

(10) Patent No.: US 12,026,222 B2
(45) Date of Patent: Jul. 2, 2024

(54) APPARATUS AND METHODS FOR IMPROVED SUBSURFACE DATA PROCESSING SYSTEMS

(71) Applicant: Schlumberger Technology Corporation, Sugar Land, TX (US)

(72) Inventors: Vikas Jain, Sugar Land, TX (US); Po-Yen Wu, Houston, TX (US); Aria Abubakar, Sugar Land, TX (US); Shashi Menon, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/176,619

(22) Filed: Mar. 1, 2023

(65) Prior Publication Data

US 2023/0205842 A1    Jun. 29, 2023

Related U.S. Application Data

(63) Continuation of application No. 16/650,847, filed as application No. PCT/US2018/052953 on Sep. 26, 2018, now Pat. No. 11,609,353.

(Continued)

(51) Int. Cl.
*G06F 17/18*    (2006.01)
*G01V 1/30*    (2006.01)
(Continued)

(52) U.S. Cl.
CPC .............. *G06F 17/18* (2013.01); *G01V 1/306* (2013.01); *G01V 1/50* (2013.01); *G06N 7/01* (2023.01); *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 5,181,112 A | 1/1993 | Citta et al. | |
| 2006/0074825 A1* | 4/2006 | Mirowski | ............. G06F 18/295 |
| | | | 706/20 |

(Continued)

FOREIGN PATENT DOCUMENTS

| | | |
|---|---|---|
| CA | 2889079 A1 | 10/2015 |
| CN | 1130969 A | 9/1996 |

(Continued)

OTHER PUBLICATIONS

Anonymous, "Facies classification based on Hidden Markov model," IP.Com Journal, IP.Com Inc., West Henrietta, NY, US, Jan. 23, 2013, 6 pages.

(Continued)

*Primary Examiner* — Paul D Lee

(57) ABSTRACT

A method and apparatus for subsurface data processing includes determining a set of clusters based at least in part on measurement vectors associated with different depths or times in subsurface data, defining clusters in a subsurface data by classes associated with a state mode, reducing a quantity of the subsurface data based at least in part on the classes, and storing the reduced quantity of the subsurface data and classes with the state model in a training database for a machine learning process.

26 Claims, 10 Drawing Sheets

Related U.S. Application Data

(60) Provisional application No. 62/563,571, filed on Sep. 26, 2017.

(51) Int. Cl.
    *G01V 1/50*     (2006.01)
    *G06N 7/01*     (2023.01)
    *G06N 20/00*     (2019.01)

(56) References Cited

U.S. PATENT DOCUMENTS

| | | | |
|---|---|---|---|
| 2012/0084007 A1 | 4/2012 | Tran et al. | |
| 2012/0323495 A1 | 12/2012 | Zhou et al. | |
| 2015/0193691 A1* | 7/2015 | Silversides | G01V 5/06 706/11 |
| 2016/0307312 A1 | 10/2016 | Sungkorn et al. | |
| 2016/0313463 A1* | 10/2016 | Wahrmund | G01V 1/30 |
| 2017/0076224 A1 | 3/2017 | Munawar | |
| 2017/0254910 A1 | 9/2017 | Can et al. | |
| 2018/0106917 A1* | 4/2018 | Osypov | G01V 1/003 |

FOREIGN PATENT DOCUMENTS

| | | |
|---|---|---|
| CN | 102053270 A | 5/2011 |
| CN | 103346799 A | 10/2013 |
| CN | 104023216 A | 9/2014 |
| CN | 104406623 A | 3/2015 |
| CN | 104537694 A | 4/2015 |
| CN | 104570083 A | 4/2015 |
| CN | 105242026 A | 1/2016 |
| CN | 106338763 A | 1/2017 |
| DE | 10021284 A1 | 11/2001 |
| IN | 106815605 A | 6/2017 |

OTHER PUBLICATIONS

Khreich, et al., "A survey of techniques for incremental learning of HMM parameters," Information Sciences, vol. 197, Aug. 2012, pp. 105-130.

Li, et al., "Clustering Sequence Data using Hidden Markov Model Representation," Proceedings of SPIE, vol. 3695, Feb. 25, 1999, pp. 14-21.

Lindberg, et al., "Petro-Elastic Log-Facies Classification Using the Expectation-Maximization Algorithm and Hidden Markov Models," Mathematical Geosciences, Springer Berlin Heidelberg, Berlin/Heidelberg, vol. 47, No. 6, Jun. 24, 2015, pp. 719-752.

Pimentel, et al., "A review of novelty detection," Signal Processing, vol. 99, Jan. 2, 2014, pp. 215-249.

Tabor, et al., "Cross-entropy clustering," Pattern Recognition, vol. 47, No. 9, Mar. 18, 2014, pp. 3046-3059.

Wu, et al., "Machine learning-based method for automated well-log processing and interpretation," SEG Technical Program Expanded Abstracts, Aug. 2018, pp. 2041-2045.

Search Report and Written Opinion of International Patent Application No. PCT/US2018/052953 dated Jan. 4, 2019, 17 pages.

Examination report issued in European Patent Appl. No. 18786582.9 dated Mar. 4, 2022; 5 pages.

First Office Action issued in China patent Application No. 201880073207.8 dated Mar. 28, 2023 with partial English translation; 16 pages.

2nd Office Action issued in Chinese Patent Application No. 201880073207.8 dated Jan. 3, 2024, 10 pages with English Summary.

Notice of Decision to Grant issued in Chinese Patent Application No. 201880073207.8, dated Mar. 21, 2024, 7 pages with English Summary.

* cited by examiner $$M = \begin{array}{c|c|c|c|c|} & \text{MEAS 1} & \text{MEAS 2} & \ldots & \text{MEAS s} \\ \hline \text{DEP 1} & m_{11} & m_{12} & \ldots & m_{1s} \\ \hline \text{DEP 2} & m_{21} & m_{22} & \ldots & m_{2s} \\ \hline \text{DEP 3} & m_{31} & m_{32} & \ldots & m_{3s} \\ \hline \vdots & \vdots & \vdots & & \vdots \\ \hline \text{DEP d} & m_{d1} & m_{d2} & \ldots & m_{ds} \\ \hline \end{array} = \begin{bmatrix} \bar{m}_1 \\ \bar{m}_2 \\ \bar{m}_3 \\ \vdots \\ \bar{m}_d \end{bmatrix}$$

FIG. 3

APPARATUS AND METHODS FOR IMPROVED SUBSURFACE DATA PROCESSING SYSTEMS

CROSS-REFERENCE TO RELATED APPLICATION(S)

This application is a continuation of pending U.S. patent application Ser. No. 16/650,847, filed on Mar. 25, 2020, which is a National Stage Entry of PCT Application No. PCT/US2018/052953, filed on Sep. 26, 2018, which claims benefit of U.S. Provisional Application No. 62/563,571, filed on Sep. 26, 2017. The contents of the foregoing applications are incorporated herein by reference in their entirety.

BACKGROUND

Geological systems and services include a variety of fields related to exploration and resource production activities from subterranean and subsea regions. For example, geological services may include oil services, natural gas services, mining services for fossil fuels, metals, and minerals, as well as environmental protection, cleanup, and surveying services.

Oil services relate to a variety of services and systems associated with exploration, drilling, production, maintenance, and other activities related to identification and production of oil, natural gas, and other fuel products. Such systems are often very complex, and require the assistance of highly specialized, educated, and knowledgeable experts to design system data acquisition and analysis processes. Analysis of the data is generally not very straightforward, and involves many different steps and calculations.

A data acquisition system may include any type of system that acquires data and provides that data for further processing. An example of a data acquisition system is a sensor system, where one or more physical sensor devices is configured to generate a signal in response to a measurement or detected level of a physical parameter. Other data acquisition systems include digital monitoring devices, measurement devices, automated data collection devices, and the like. A complex system may include multiple data acquisition systems or devices, including data acquisition systems of disparate types.

A workflow may include a set of data to be acquired by a particular data acquisition system, a set of analytics tools to be used for analyzing the acquired data, a sequence of analysis, a set of calculations or operations to be performed on the acquired data, and a set of quantities of interest to be generated by the workflow. In prior systems, the workflow was designed and often implemented by experts, with independent and specialized knowledge used to accomplish an analysis project. A problem with expert definition of the workflow is that the knowledge employed by one expert to design a workflow may be different from the knowledge used by another expert. Therefore, results are not standardized and inconsistencies exist. Moreover, when a particular expert changes jobs or leaves a particular post, the knowledge acquired and used by that expert for designing the workflows is forgotten or lost to the company employing the expert. Various other issues and problems exist with prior use of experts for design and/or implementation of data acquisition and analysis workflows.

Traditional processing and interpretation workflows are subjective, inconsistent depending on a petro-technical expert's expertise, and slow in turning around the deliverables. Attempts to use machine learning have required (1) a large amount of data (depth samples) to effectively span the measurement space and (2) a high number of measurements to correctly deduce low dimensional feature set. The requirements of machine learning-based approaches are not generally available, making its applications limited.

BRIEF SUMMARY

Methods and systems for improving subsurface data processing systems are described. While some embodiments may discuss a particular type of data, it will be appreciated that the disclosure is not limited thereto and subsurface data may include, among other data, any data acquired on depth or time that may represent below earth information. Examples of subsurface data include seismic data, well logs, production data, core data, pressure data, temperature data, data from samples, and so forth.

In an example, a method for subsurface data processing includes determining a set of clusters based at least in part on measurement vectors associated with different depths or times in the subsurface data, defining clusters in the subsurface data by classes associated with a state model, reducing a quantity of the subsurface data based at least in part on the classes, and storing the reduced quantity of the subsurface data and classes with the state model in a training database for a machine learning process.

The depths or times of the measurement vectors may be continuous.

The depths or times of the measurement vectors may be discontinuous.

The method may include reconstructing input data and validating the state model based at least in part on the reconstructed input data.

The method may include receiving new input data and applying the state model to the new data.

The method may include determining new predicted data based at least in part on a result of the state model applied to the new input data.

The method may include generating a visualization of the identified classes and the reduced quantity of the subsurface data.

The determining the set of clusters may include a cross entropy clustering operation.

An output of the cross entropy clustering operation may be applied to a Gaussian mixture model process.

The Gaussian mixture model process may remove sphericity from the data.

An output of the Gaussian mixture model process may be applied to a hidden Markov model process.

An output of the hidden Markov model may include classes with a state model.

In another example, a subsurface data processing apparatus includes a memory and a processor. The memory is configured to store subsurface data and a knowledgebase for a machine learning process. The processor is configured to determine a set of clusters based at least in part on measurement vectors associated with different depths or times in the subsurface data, define clusters in the subsurface data by classes associated with a state model, reduce a quantity of subsurface data based at least in part on the defined classes, and store the reduced quantity of the subsurface data and classes with state model in the knowledgebase for the machine learning process.

The depths or times of the measurement vectors may be continuous.

The depths or times of the measurement vectors may be discontinuous.

The processor may be configured to reconstruct input data and validate the state model on the reconstructed input data.

The processor may be configured to receive new input data and apply the state model to the new data.

The processor may be configured to determine new predicted data based at least in part on a result of the state model applied to the new input data.

After assignment of classes to the new data, the processor may be configured to store updated processing or interpretation parameters in the knowledgebase, and the processor may be configured to apply the updated processing or interpretation parameters by classes to generate outputs automatically.

The processor may be configured to generate a visualization of the identified classes and the reduced quantity of the subsurface data.

The processor may be configured to determine the set of clusters based at least in part on a cross entropy clustering operation.

The processor may be configured to perform a Gaussian mixture model process on an output of the cross entropy clustering operation.

The processor may be configured to remove sphericity from the data using the Gaussian mixture model process.

The processor may be configured to perform a hidden Markov model process on an output of the Gaussian mixture model process.

An output of the hidden Markov model may include a class with a state model.

In another example, a method includes providing training data and input data, the training data including reduced training data and classes with at least one state model, assigning training data classes with a state model to the input data, reconstructing input data based at least in part on the training data, determining a reconstruction error based at least in part on the reconstructed input data, sorting the input data based at least in part on the reconstruction error, and providing the sorted input data as an output.

The determining the reconstruction error may include determining a root mean square error between actual and reconstructed measurements.

The determining the root mean square error may include normalizing the root mean square error class by class.

The method may include displaying the sorted input data in a visualization.

The method may include determining a class assignment probability for the sorted input data.

In an example, a subsurface data processing apparatus includes a memory and a processor. The memory is configured to store subsurface data and a knowledgebase for a machine learning process. The processor is configured to provide training data and input data, the training data including reduced set of training data and classes with at least one state model, reconstruct input data based at least in part on the training data, determine a reconstruction error based at least in part on the reconstructed input data, sort the input data based at least in part on the reconstruction error, and provide the sorted input data as an output.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 3 is a table illustrating an embodiment of subsurface measurements.

DETAILED DESCRIPTION

Various features and advantageous details are explained more fully with reference to the nonlimiting embodiments that are illustrated in the accompanying drawings and detailed in the following description. It should be understood, however, that the detailed description and the specific examples are given by way of illustration only, and not by way of limitation. Various substitutions, modifications, additions, and/or rearrangements within the spirit and/or scope of the disclosure will become apparent to those skilled in the art.

The present disclosure is directed to improved apparatus and methods for subsurface data processing systems that provide an ordered combination that provides new results in subsurface data processing. In an example, the present application describes a new processing device that presents subsurface data results in a new form, provides new outputs, has higher reliability, uses lower processing resources or provides improved performance. The apparatus and method described cannot be performed manually in any useful sense. Simplified datasets may be used for illustrative purposes but it will be appreciated that the disclosure extends to datasets with many thousands of points thereby necessitating the new hardware-based processing system described herein.

Figure 1:
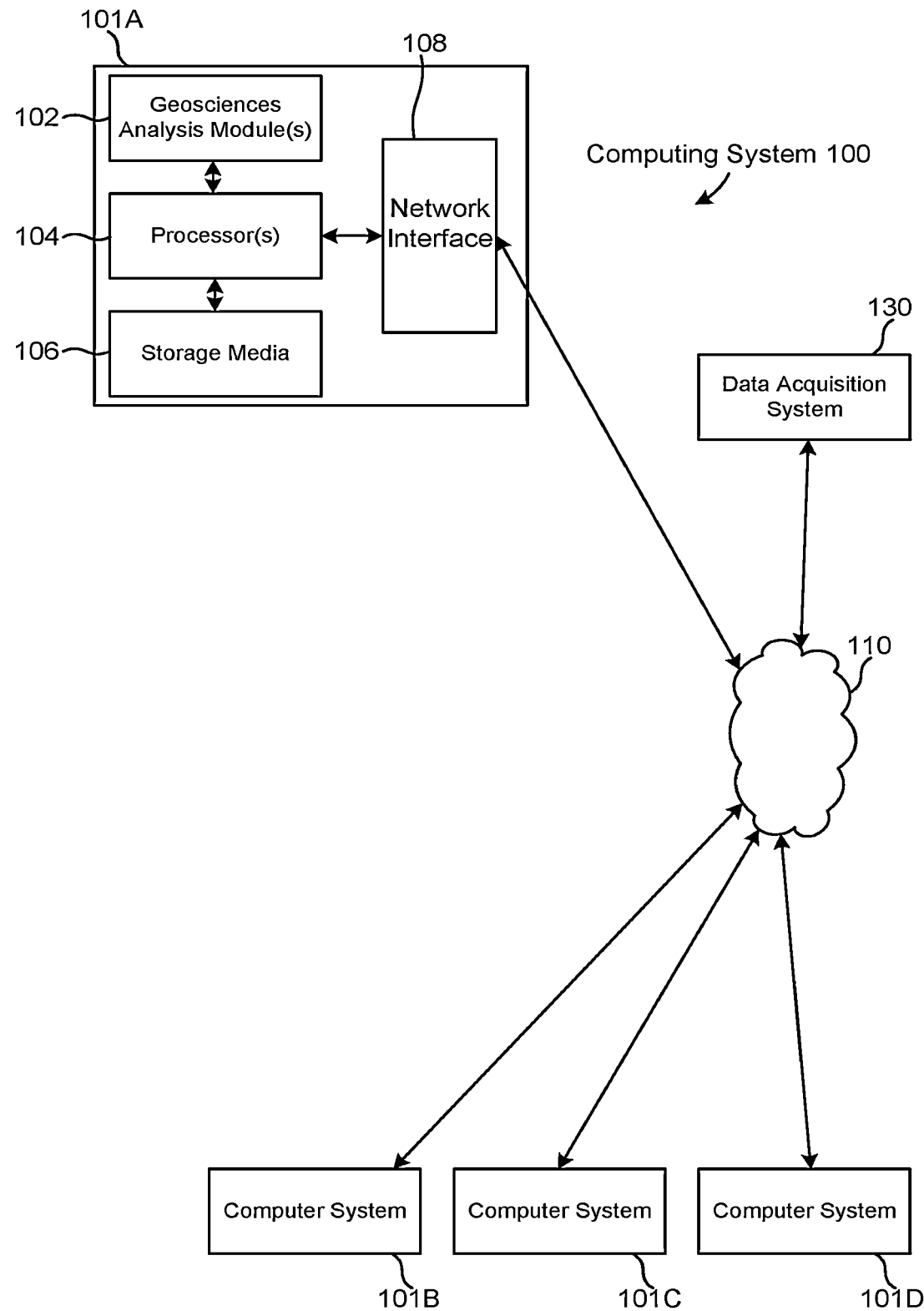
FIG. 1 is a schematic block diagram illustrating an embodiment of a system for augmented geological service characterization.

FIG. 1 depicts an example geological system 100 in accordance with some embodiments. The system 100 can be an individual system 101A or an arrangement of distributed systems. The system 101A includes one or more geosciences analysis modules 102 that are configured to perform various tasks according to some embodiments, such as one or more methods disclosed herein. To perform these various tasks, geosciences analysis module 102 executes independently, or in coordination with, one or more processors 104, which is (or are) connected to one or more storage media 106A. The processor(s) 104 is (or are) also connected to a network interface 108 to allow the system 101A to communicate over a data network 110 with one or more additional systems and/or systems, such as 101B, 101C, and/or 101D (note that systems 101B, 101C and/or 101D may or may not share the same architecture as system 101A, and may be located in different physical locations, e.g. systems 101A and 101B may be on a ship underway on the ocean or at a wellsite, while in communication with one or more systems such as 101C and/or 101D that are located in one or more data centers on shore, other ships, and/or located in varying countries on different continents). Note that data network 110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 106A can be implemented as one or more computer-readable or machine-readable storage media. Note that while in the exemplary embodiment of FIG. 1 storage media 106A is depicted as within computer system 101A, in some embodiments, storage media 106A may be distributed within and/or across multiple internal and/or external enclosures of computing system 101A and/or additional computing systems. Storage media 106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that system 101A is only one example and that system 101A may have more or fewer components than shown, may combine additional components not depicted in the example embodiment of FIG. 1, and/or system 101A may have a different configuration or arrangement of the components depicted in FIG. 1. The various components shown in FIG. 1 may be implemented in hardware, software, or a combination of both hardware and software, including one or more signal processing and/or application specific integrated circuits.

It should also be appreciated that system 100 may include user input/output peripherals such as keyboards, mice, touch screens, displays, etc. The system 100 may include desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with hardware are all included within the scope of the disclosure.

Data acquisition system 130 may include systems, sensors, user interface terminals, and the like, which are configured to receive data corresponding to records collected at an oil services facility, such as an exploration unit, oil drilling rig, oil or gas production system, etc. Acquired data may include sensor data, log data, computer generated data, and the like.

Figure 2:
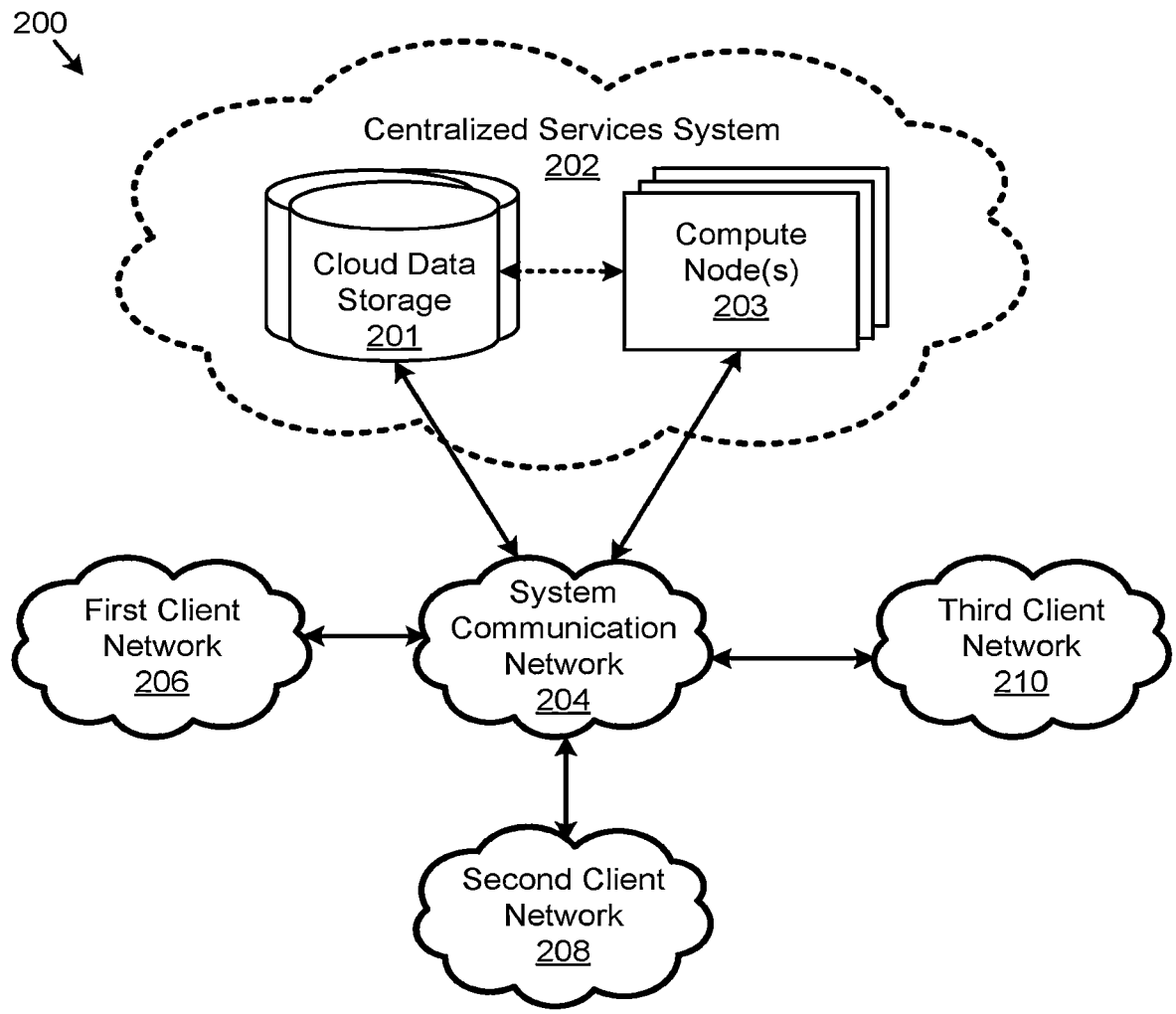
FIG. 2 is a schematic block diagram illustrating an embodiment of a system for augmented geological service characterization.

With reference to FIG. 2, a multi-client system 200 may include a centralized services system 202, which may be implemented on a cloud services system, for example. In such an embodiment, the centralized services system 202 may include one or more cloud data storage systems 201 and one or more compute nodes 203. In such an embodiment, the system 200 may include multiple client networks, including a first client network 206, a second client network 208, and a third client network 210. Each client network 206-210 may communicate with the centralized services system 202 via a system communication network 204, which may be the Internet or a dedicated WAN connection.

In such embodiments, each of the client networks 206-210 may include components described in FIG. 1, such as the computer systems 101A-D and the data acquisition system 130, etc. Such devices may be further connected via an internal network 110. In such an embodiment, each of the client networks 206-210 may communicate with the centralized services system 202 for data storage and implementation of certain centralized data processing and analysis processes.

Class Based Machine Learning

A class-based machine learning (CBML) approach to use machine learning will now be discussed in more detail. This approach provides example improvements over expert-centric (e.g., manual) and prior machine learning-based approaches by reducing the training data (depth samples of subsurface data) into a few explainable classes, and learning models by classes, which may be referred to as a state model. The assignment probabilities of new data points belonging to classes are computed. In some embodiments, each new data point is then assigned the class with the highest probability, if it is over a certain threshold, establishing that the limited training data spans the new data point and the learned model by class can be applied. In other embodiments, one or more new data point(s) are then assigned the class with the highest probability, if it is over a certain threshold, establishing that the limited training data spans the new data point and the learned model by class can be applied. Two other possibilities—depths or times not assigned any classes and depths or times equiprobable to many existing classes—may be further characterized by taking more measurements. Using the characteristic measurements of the classes, uncertainties of the results are computed. Determining uncertainties of the results is solving one of the biggest drawbacks of pure machine learning based approach.

In an example, CBML acquires knowledge from the training data, and then propagates, if applicable, to the next piece of data, reducing or eliminating the need for a large training data set. The clustering, classes with state model and uncertainty estimation approach provides for the application to other data with fewer measurements. CBML may remove subjectivity and inconsistency, and may also substantially improve the turn-around time. The approach also be transformed into a continuous learning, extraction, and application loop that in some cases may completely automate many workflows, including but not limited to processing and interpretation of subsurface data.

Referring to FIG. 3, subsurface measurements acquired over depth (or time-based measurements acquired on surface) can be represented as a matrix M. In some embodiments, each row includes a vector of measurements, $\overline{m}_i$, over a depth or time. In other embodiments, one or more rows includes a vector of measurements, $\overline{m}_i$, over a depth or time.

Acquired measurements (e.g., MEAS 1, MEAS 2, ..., MEAS s) may be highly correlated and measurement vectors (e.g., $\overline{m}_i$'s) may be very similar over several depths or times because of the nature of the measured geological formations, causing high redundancy in both measurements and depth or time space. Both redundancies are of interest. Measurement redundancy may solve for the same underlying petrophysical property using different physical or observed models. Depth redundancy shows the patterns present over depth or time that provides insight into depositional environment, stratigraphy, structure, and geology of the formations (or in other embodiment, patterns in production history data).

In some cases, the highly redundant data is reduced in the measurement space before applying machine learning. Techniques to do so are principle component analysis and principal factors analysis. Although measurements are highly correlated, doing data reduction in the measurement space may result in obfuscation of patterns in the depth or time space.

Figure 4:
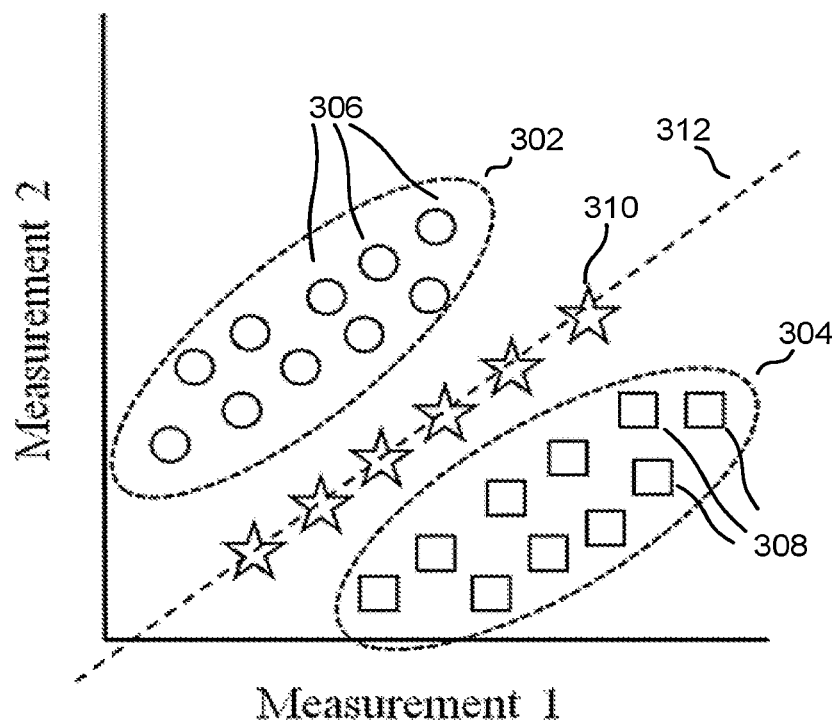
FIG. 4 is a plot illustrating an example of clustering.

FIG. 4 illustrates two separable clusters 302 and 304 based on two measurements. The cluster 302 includes a plurality of data points 306. The cluster 304 includes a plurality of data points 308. After data reduction (e.g., principle component analysis), the reduced measurement is no longer separable. The reduced data has the data points 310 in a projected reduced measurement having a principal component 312. The patterns or clusters of interest become hidden.

The CBML approach of the disclosure may keep more or all information present in the measurements space intact by reducing the data in the depth or time space and creating classes of depths with similar measurement vectors. This may be done for the input training data. The measurement matrix of training data is denoted by $M_T$.

Creating Classes in Training Data's Depth Space

There are several considerations in creating classes of depths or times with similar measurements vectors. One machine learning technique is clustering, which may include an a-priori number of clusters and respective shapes. While the number of clusters may not be known for the training data, shapes of clusters could be non-spherical, and a set of clustering methods may be used to determine optimal clusters in the training data.

When the nature of subsurface formations is continuous, that is, there are no sharp boundaries but softer transitions, a consistency may be proscribed in clusters over depth or time. Cluster number at a depth or time i is in some cases the same as on depth or time i−1. Probability of a depth or time belonging to a cluster may be used to compute uncertainties, which are a desirable quantity for the ensuing petrophysical results.

Figure 5:
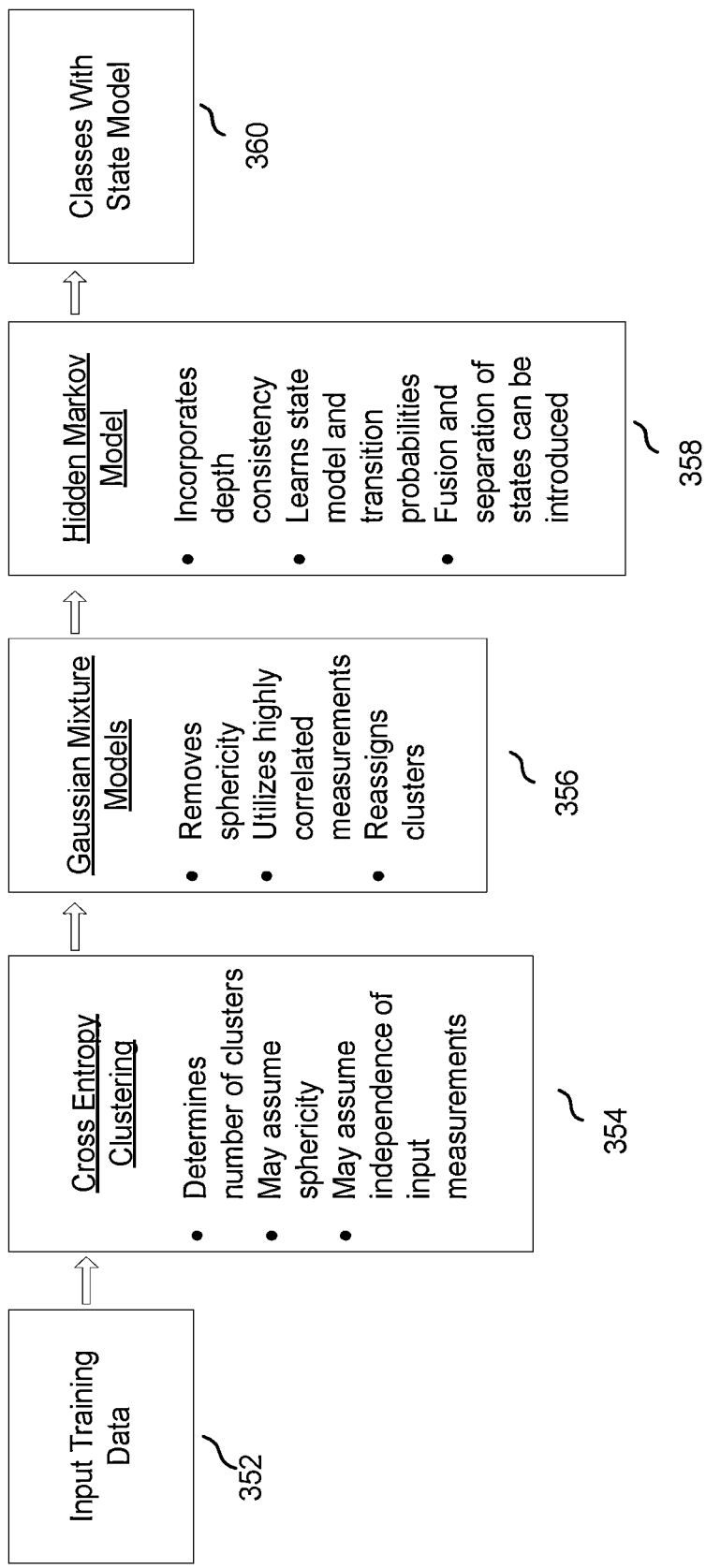
FIG. 5 is a flow chart illustrating an embodiment of unsupervised learning.

Referring to FIG. 5, an unsupervised learning process may use a combination of clustering techniques. The process includes classes with a state model, including transition and emission probabilities, and classes is the output.

At step 352, training data, which may be standardized, is input. At step 354, as an example, cross entropy clustering (CEC) may be used to determine a preferable number of clusters. For example, training data may have 5, 10, 12, 15 or 20 clusters with each cluster having similar measurement vectors appearing over multiple continuous or non-continuous depths. One parameter used in cross entropy clustering is the upper bound on the number of clusters. This can be determined using the lowest vertical resolution among all the measurements being used. For example, in a 1000 ft data with a set of measurements in which the lowest vertical resolution is 5 ft, measurements in a layer of height 5 ft or lower would not be resolved. Thus, a maximum number of clusters may be 1000/20=50 which can be used to initialize the CEC. The CEC may assume sphericity and may assume independence of input measurements. Several other clustering methods could be equally used to achieve the objective of determining the optimal number of clusters and initial clustering results. However, it will be appreciated that these assumptions are only exemplary for certain embodiments and are not limiting of the disclosure.

At step 356, a Gaussian mixture model (GMM) uses the CEC results to initialize and then iterates to reassign clusters into multivariate Gaussians. In some embodiments, the GMM is not restricted for the shape of Gaussians. The GMM may remove sphericity, utilize highly correlated measurements, and reassign the clusters. For example, a particular depth or time i in the training data may have been assigned cluster 5 (of 20 clusters) by a CEC that assumed sphericity. Then, GMM relaxes the sphericity constraint and may assign cluster number 11 to the same depth or time i.

At step 358, a hidden Markov model (HMM) uses the GMM results to initialize and then iterates to learn a state (cluster) model. The state model may include transition probabilities and emission probabilities in Gaussians. Emission probability provides the probability of observing a cluster j at a particular depth or time i which can also be a ratio of the number of depths or times with cluster j over the depths or times in the data. Transition probability provides the probability of cluster j at depth or time i changing to cluster k at depth or time i+1. Continuing from the example in the last paragraph, cluster 15 may have a high emission probability of 60% and transition probability of changing from cluster 11 to cluster 15 is 30%. Then, the joint probability of transitioning from cluster 11 at depth or time i to cluster 15 at depth or time i+1 would be 18% (0.6*0.3). Similar joint probabilities for the clusters for depth or time i+1 may be computed using the state model including emission and transition probabilities. Whichever cluster has the highest joint probability may be the cluster at depth or time i+1 given cluster 11 at depth or time i. In an embodiment, shape is not restricted and transitions of clusters from one depth or time to next is penalized. The HMM may be single order and may also be n-th order. By using higher order HMM, the regularization over depth is increased, and it may lead to a smoother transition in formations.

At step 360, clustering results or classes with the state model are output. The output may be final or it may also be intermediate and passed on for further processing.

In other embodiments, some steps may be reordered. In other embodiments, some steps may be added. In other embodiments, some steps may be omitted. In other embodiments, some steps may be altered to include other techniques known to those with skill in the art.

Figure 6:
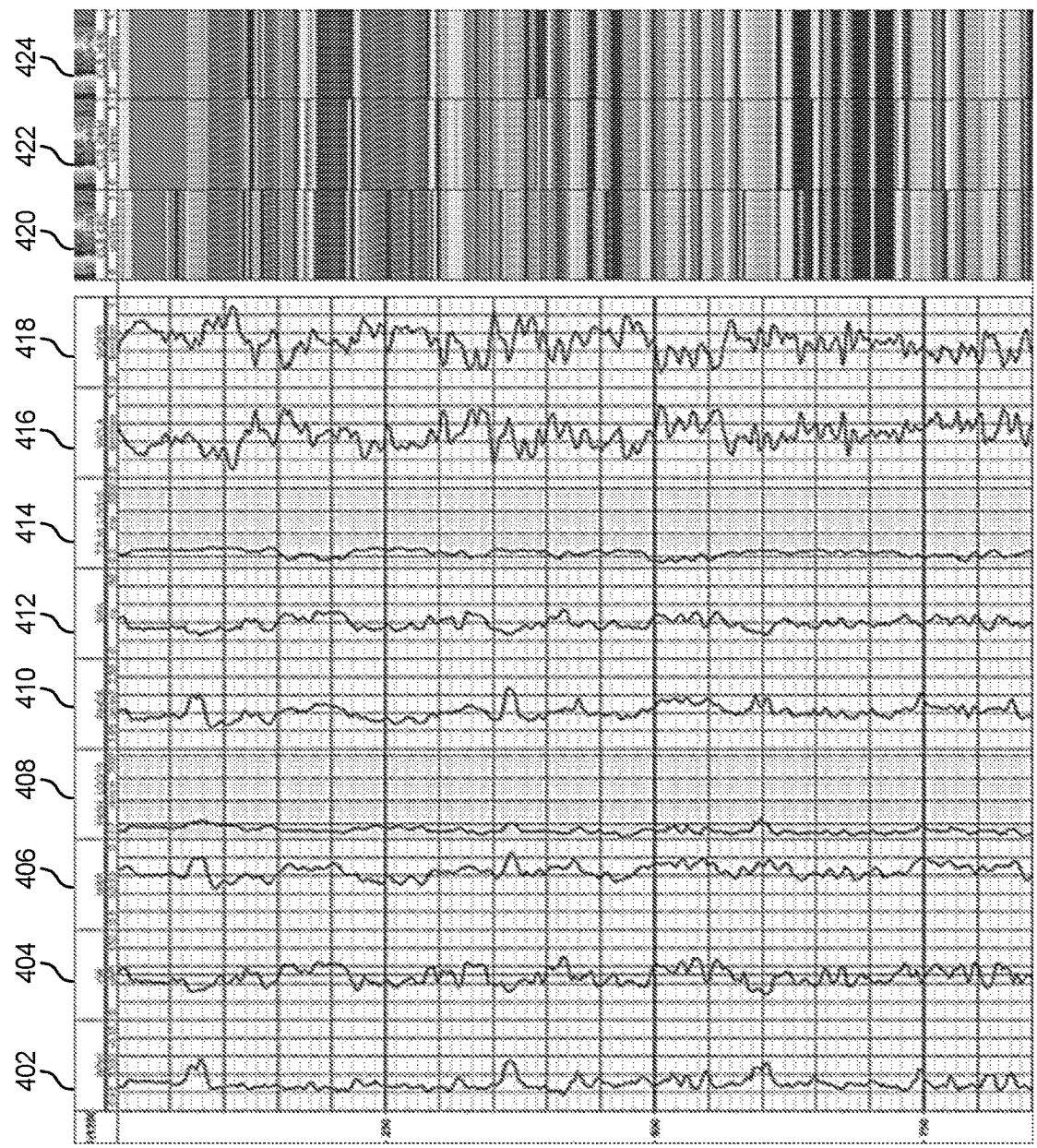
FIG. 6 is a plot of an embodiment of processed data.
Figure 7:
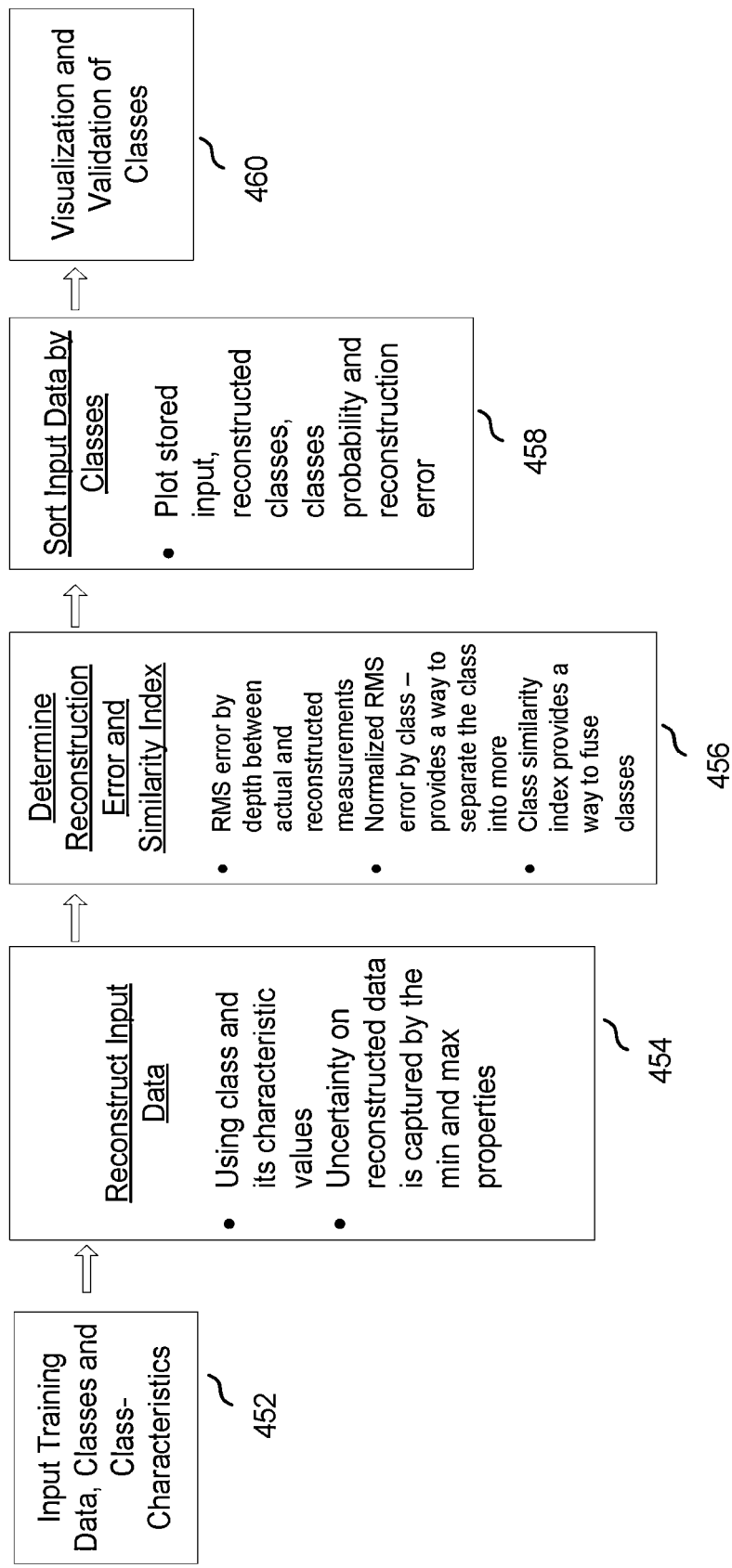
FIG. 7 is a flow chart illustrating an embodiment of a class validation process.

FIG. 6 illustrates an example of clustering results for real data processed as described in FIG. 5. Tracks 1 to 9 (402, 404, 406, 408, 410, 412, 414, 416, 418) illustrate input measurements used for training. Track 10 (420) illustrates classes after cross entropy clustering. Track 11 (422) illustrates reassigned classes after applying the Gaussian mixture model. Track 12 (424) illustrates regularized classes from the hidden Markov model.

Characterizing Training Classes

The training classes may be characterized using one or more of the following properties:

1. Mean measurement vector for one or more (or each) class (denoted by $\overline{\mu}_c$).

2. Covariance matrix of measurements for one or more (or each) class (denoted by $\Sigma_c$).
3. Gaussian probability density function for one or more (or each) class (denoted by $\mathcal{N}(\bar{\mu}_c, \Sigma_c)$).
4. Minimum and maximum measurement vectors for one or more (or each) class (denoted by $\bar{\mu}_c \pm a\sqrt{\text{diag}(\Sigma_c)}$).

Validating and Visualizing Training Classes

FIG. 6 illustrates a class validation process. At step 452, training data, classes and class characteristics are input. At step 454, input data is reconstructed. The reconstruction may include using the class and its characteristic values. The reconstruction may also include capturing uncertainty on reconstructed data based on min and max properties.

At step 456, reconstruction error and similarity index are computed. The computation may include determining RMS error by depth or time between actual and reconstructed measurements, normalized RMS error by class (based on which the class may be separated into further classes), and a class similarity index (based on which classes may be separated or fused).

At step 458, the input data is sorted by classes. The sorting may include plot sorted input, reconstructed classes, classes probability and reconstruction error. At step 460, the output may be provided to a display for visualization and validation of the classes.

It will be appreciated that the workflow may validate unsupervised learning results. This workflow may also be used to assigned classes to new data are validated. If classes are separated or fused, then a new state model may be learned and the process repeated.

Figure 8:
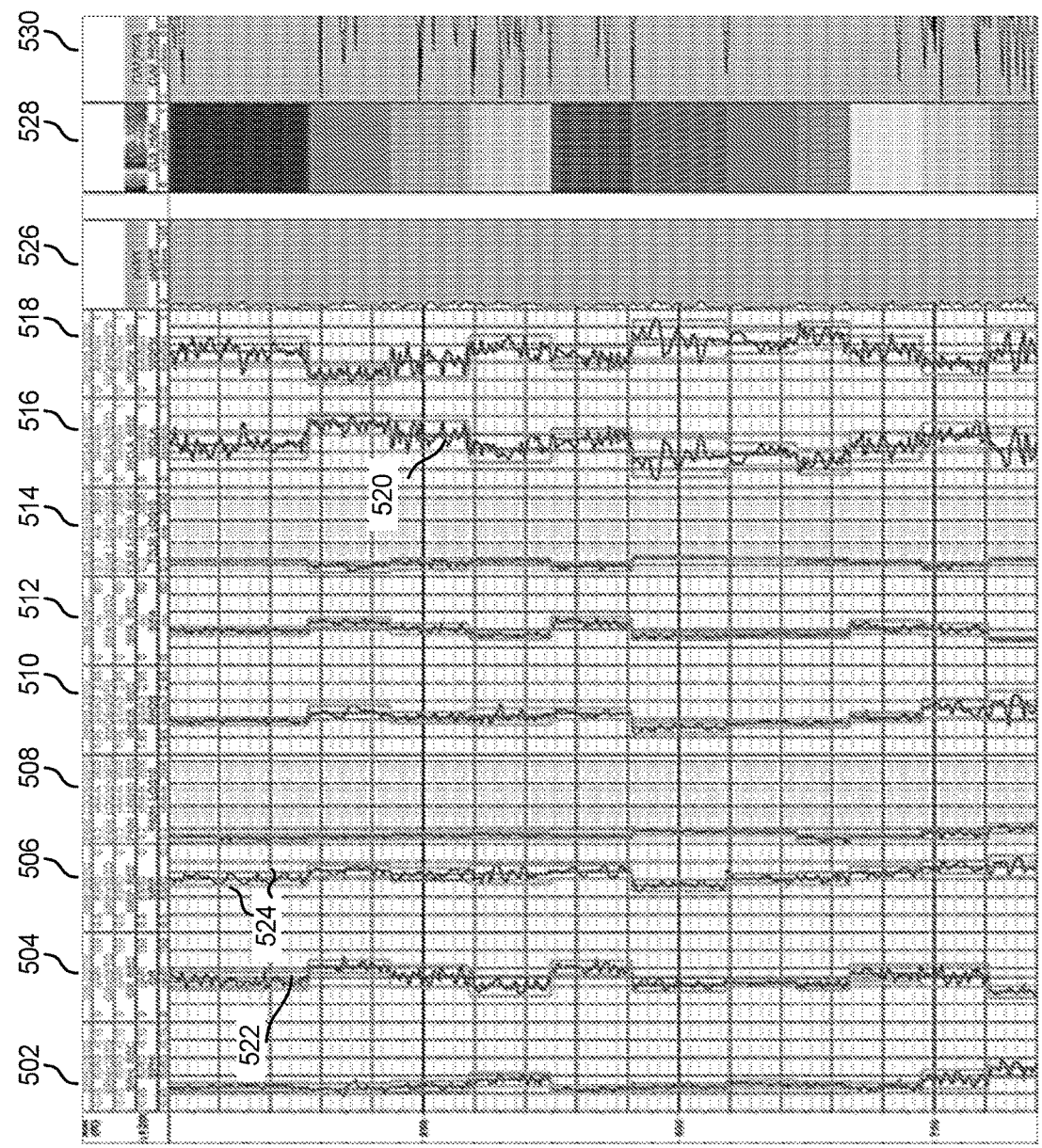
FIG. 8 is a plot of an embodiment of processing training data.

Referring to FIG. 8, for the example training data, assignment probabilities are high and reconstruction errors are small. These two quantities may be used to benchmark the same when assigning the classes to the new data. Tracks 1 to 9 (502, 504, 506, 508, 510, 512, 514, 516, 518) illustrate input measurements used for training (e.g., 520) with reconstruction (e.g., 522) and error bounds (e.g, 524), Track 10 (526) illustrates reconstruction errors measured by symmetric mean absolute percentage error (sMAPE). Track 11 (528) illustrates regularized classes from the hidden Markov model. Track 12 (530) illustrates class assignment probabilities.

Learning Outputs by Classes and Creating a Knowledgebase

After the training classes have been validated, outputs by classes may be learned and stored alongside class properties. Different types of output that may be learned include:
1. Parameters used to process and/or interpret training data by class.
2. Machine learning models created using outputs and inputs by class.

The state model, training classes, respective properties, and learned outputs are stored in a knowledgebase. This may provide a knowledgebase having a small size. In the case where the classes correspond with a physical meaning, user-specified labels may also be stored in the same knowledgebase alongside classes.

Assignment of Classes to New Data and Generation of Output Data

Figure 9:
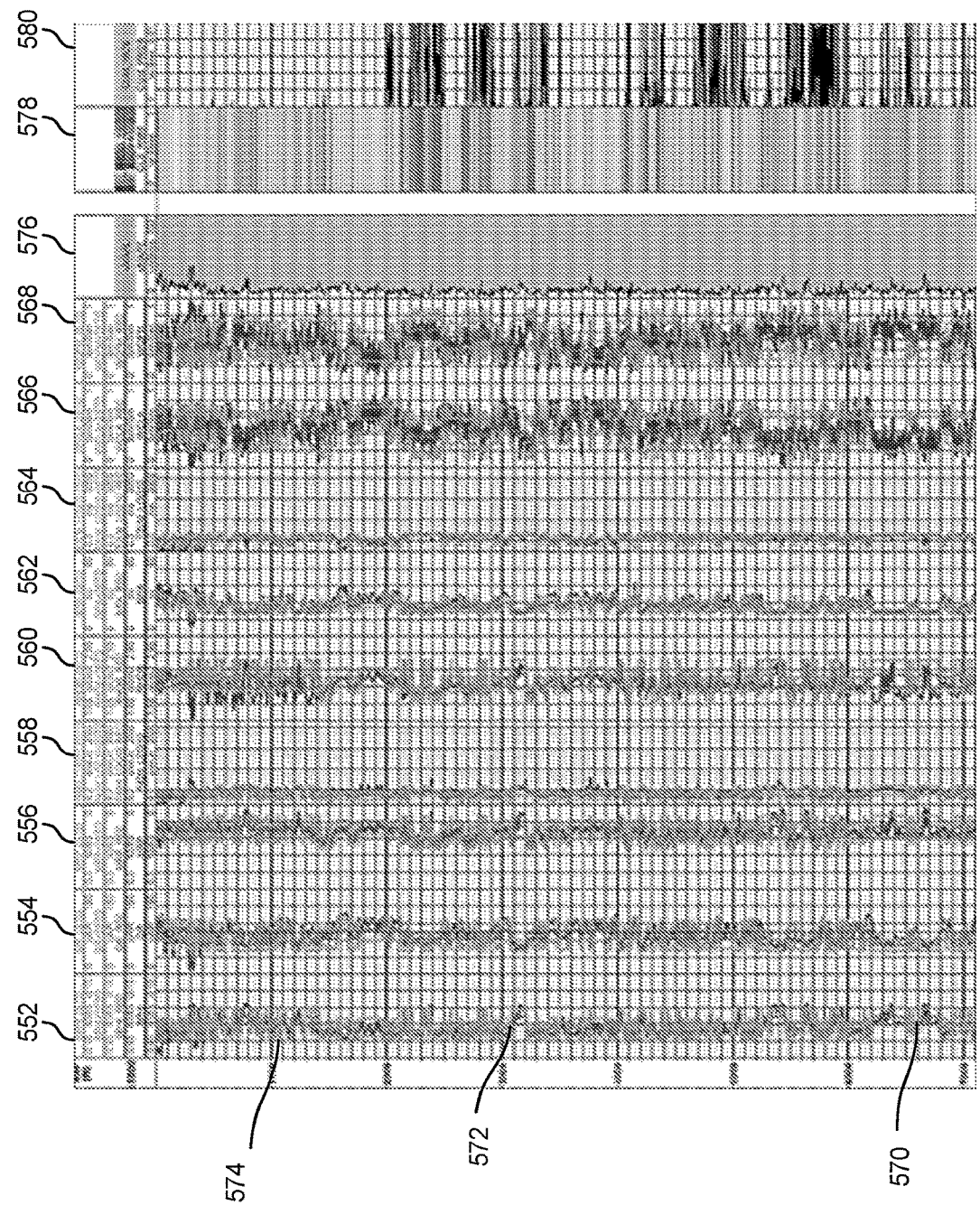
FIG. 9 is a plot of an embodiment of processing new data.

On receiving new data, in some embodiments, each new data point may be assigned to the classes in the knowledgebase using either class-properties or state models and assignment probabilities computed. In other embodiments, one or more new data point(s) may be assigned to the classes in the knowledgebase using either class-properties or state models and assignment probabilities computed. New data input may also be reconstructed and a symmetric mean absolute percentage error (sMAPE) computed (as illustrated in FIG. 9). Using assignment probabilities and reconstruction errors in the training data as benchmark, quality of assignment to new data can be evaluated. Three example cases that may be formed are:
1. High assignment probability and low reconstruction error—these new data points may be determined to be within the span and quite like the training data.
2. High assignment probability but high reconstruction error—while these new data points may be within the span of the training data, one or more measurements are deviating from the values observed in the training data, signifying some environmental effect not seen in the training data or acquisition quality issues in the test data.
3. Low assignment probability and high reconstruction error—new data may be outside of the span of training data and classes should not be assigned to these data points. Two sub-cases based on the assignment probabilities are:
   a. Very low cumulative assignment probability—new data points may be very far from the span of the training data. These are preferably re-characterized into classes of their own and newly created class-based properties, learned output model, and labels are stored back into the knowledgebase.
   b. Similar assignment probability for two or more classes—new data points may be approximately equidistant in measurement hyperspace to two or more classes, and more measurements may be taken to improve classification. Once new measurements are acquired for these new data points, then the measurements are re-characterized into new classes and class-based properties, learned output model, and labels are stored in the knowledgebase. In the case that new measurements are not made then a probabilistic output may be generated by providing the range of parameters for the similar classes or by mixing outputs generated using learned output models from the similar classes.

FIG. 9 illustrates the processing of new data. Tracks 1 to 9 (552, 554, 556, 558, 560, 562, 564, 566, 568) illustrate input measurements of new data (570) with reconstruction (572) and error bounds (574). Track 10 (576) illustrates reconstruction errors measured by symmetric mean absolute percentage error (sMAPE). Track 11 (578) illustrates assigned classes from the hidden Markov model. Track 12 (580) illustrates class assignment probabilities.

Knowledgebase Updates and Closed Loop

Three examples of creating new cases based on the cases observed when assigning classes to the new data are:
1. Very low or zero cumulative assignment probability—these data points may be re-characterized, processed or interpreted, and reclassified into new classes. Because the measurement vector size may remain the same, these new classes may be stored directly back into the knowledgebase.
2. Similar assignment probability of two or more classes—if new measurements are acquired for these data points then the data points may be re-characterized and reclassified into new classes. The new classes may have a larger measurement vector size. These new classes may be the separation of similar classes into a higher dimensional measurement space. These new classes may replace the similar classes in the knowledgebase. Therefore, the measurement vector size in the current knowledgebase may be increased by the number of new measurements. Classes with fewer measurements may be assigned missing values for the new measurements. This new enhanced knowledgebase may then be used for the subsequent new data.

3. Greater number of measurements are acquired over all new data points—if new measurements are acquired over all new data points, then this data may be used to retrain and learn. Learning can be guided using the previous dataset and enhanced using new measurements. A subset of the new classes may be assigned the same number and type as the old ones based on the similarity of the class properties. This may provide consistency of results if the new knowledgebase is used on the previously acquired data.

A timeline and history log may be maintained with the details of knowledgebase updating. Changes to knowledgebase may provide an epoch over the timeline, signifying changes in outputs from then on.

Figure 10:
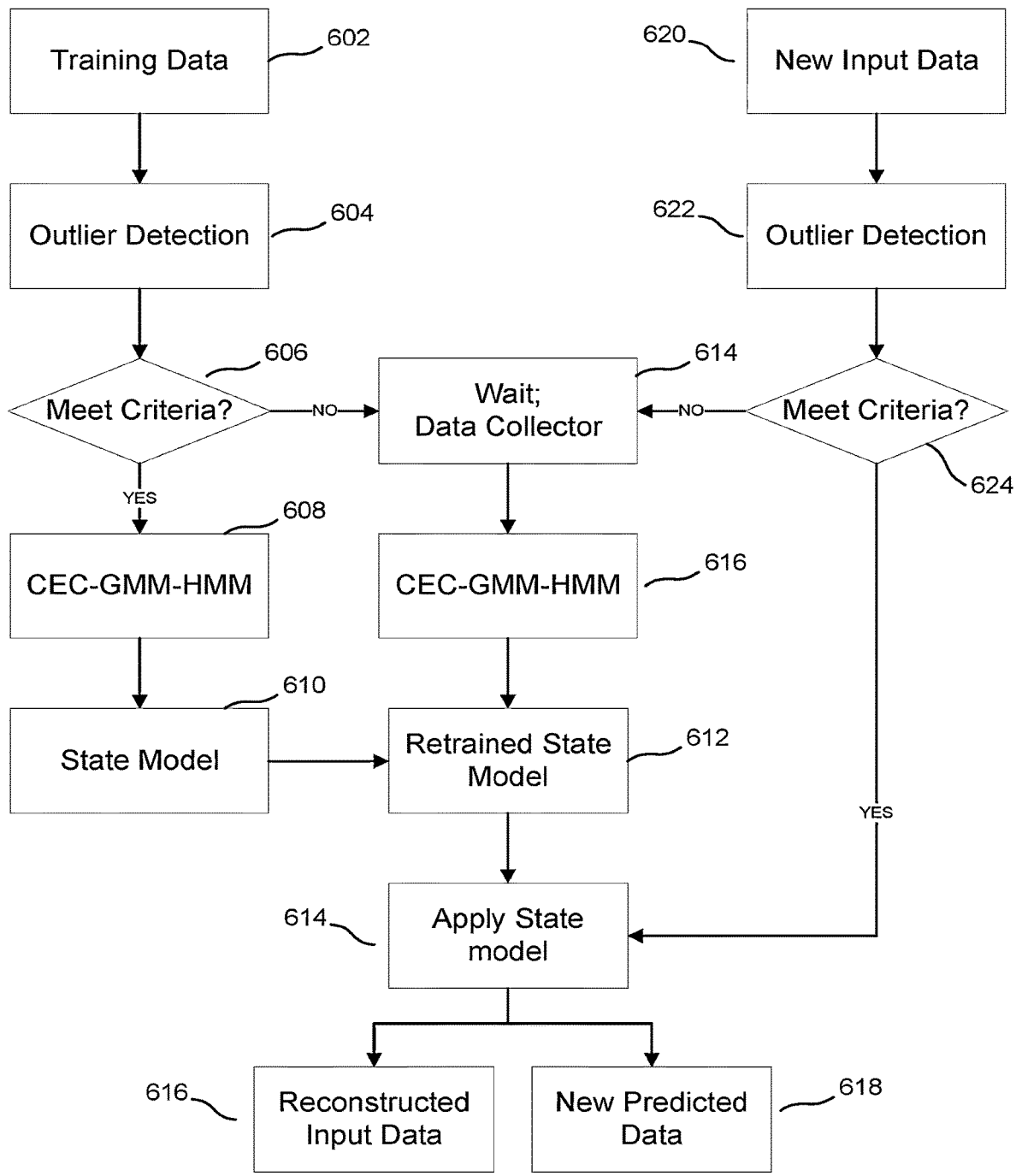
FIG. 10 is a flow chart illustrating an embodiment of a class-based machine learning workflow.

FIG. 10 illustrates an embodiment of a workflow. At step 602, training data is input. At step 604, the outlier detection is performed. At step 606, it is determined whether the training data meets criteria. For example, it is determined whether the values of the input training data are reasonable for the application of the process. If it is determined that the training data is reasonable and meets the criteria, the process advances to step 608 where the CEC-GMM-HMM steps of FIG. 5 are performed. The output of the process of FIG. 5 is a class with state model at step 610. The state model determined at step 610 is incorporated into a retrained state model at step 612.

The retrained state model is applied at the step 614 to provide reconstructed input data for validation at step 614 and/or new predicted data at step 618. Through the validation of the reconstructed input data, the knowledgebase can be improved with reduced sets of input data. Thus, at each iteration, the knowledgebase becomes more accurate.

Referring back to step 606, if it is determined that the values of the input training data is questionable and does not meet criteria, then the process waits at step 614 for more reliable data to be collected and/or provided to the system. The process advances to step 616 where the CEC-GMM-HMM steps of FIG. 5 are performed and a retrained state model is provided at step 612 and the process continues as discussed above.

At step 620, new input data such newly acquired subsurface data is provided. At step 622, outlier detection is performed. If the new input data meets reliability criteria, then the process advances to applying the state model of the knowledgebase to the new input data at step 614. If the new input data does not meet the reliability criteria, the process advances to the waiting and collection step 614.

The above described subsurface data processing system of class-based machine learning with a clustering process may provide a reliable and robust unsupervised learning results. Noise in data may be removed and results may be stabilized. For example, new data need only be compared against the blueprint or learned classes from the training data. Moreover, the knowledgebase and corresponding timeline may provide a concise and accountable way to store classes, respective properties, learnt models, and labels.

The present disclosure may be applied to any data with redundancy in measurements/feature space and depth/time/sample space.

The present disclosure may be applied for any number of measurements or samples.

An example use case for the present disclosure is an automated quality control, processing, and interpretation of depth- or time-based data, including subsurface and surface data.

Another example use case for the present disclosure is prediction. State models may be used to predict data which is dependent on a continuously increasing index such as depth or time.

Training data may be modeled or simulated data.

While various embodiments in accordance with the disclosed principles have been described above, it should be understood that they have been presented by way of example only, and are not limiting.

Furthermore, the above advantages and features are provided in described embodiments, but shall not limit the application of such issued claims to processes and structures accomplishing any or all of the above advantages.

The present embodiments have been described with particular benefit for geological systems and services. The individual aspects and ordered combinations provide a unique and improved solution to incorporating an improved training process such that machine learning techniques become practical with or without the availability of expert knowledge in workflows. While these benefits have been highlighted for geological systems and services, it will be appreciated that additional fields, which may benefit from the present embodiments, include time-based data, surface data, demographics, psychology, archeology, marine biology, and the like. Although the embodiments described herein may be useful in any of these many geological fields, the present embodiments are described primarily with reference to oil services.

It will also be appreciated that the described methods cannot be performed mentally. For example, the process described with reference to FIG. 5 cannot be practically performed by a human on any reasonable time scale. Moreover, machine learning techniques are performed, for example, by specially programmed machines.

Although the invention(s) is/are described herein with reference to specific embodiments, various modifications and changes can be made without departing from the scope of the disclosure. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises,"

"has," "includes" or "contains" one or more operations possesses those one or more operations but is not limited to possessing only those one or more operations.

The invention claimed is:

1. A method for subsurface data processing, comprising:
   determining a set of clusters based at least in part on measurement vectors associated with:
   multiple continuous or non-continuous depths comprised in the subsurface data, or
   different times in the subsurface data, wherein resolution data associated with the measurement vectors is used to determine an upper bound for the set of clusters and thereby quantify the set of clusters based on the determined upper bound;
   defining the set of clusters by classes associated with a state model;
   validating at least one class comprised in the classes;
   reducing a quantity of the subsurface data based at least in part on the at least one validated class comprised in the classes; and
   storing the reduced quantity of the subsurface data and classes with the state model in a training database for a machine learning process.

2. The method of claim 1, wherein validating the at least one class comprises determining a reconstruction error associated using one or more characteristic values of the at least one class.

3. The method of claim 1, further comprising reconstructing input data and validating the state model based at least in part on the reconstructed input data.

4. The method of claim 1, further comprising receiving new input data and applying the state model to the new input data.

5. The method of claim 4, further comprising determining new predicted data based at least in part on a result of the state model applied to the new input data.

6. The method of claim 1, further comprising generating a visualization of:
   the at least one validated class comprised in the classes, or
   the reduced quantity of the subsurface data.

7. The method of claim 1, wherein determining the set of clusters includes a cross entropy clustering operation.

8. The method of claim 7, wherein an output of the cross entropy clustering operation is applied to a Gaussian mixture model process.

9. The method of claim 8, wherein an output of the Gaussian mixture model process is applied to a hidden Markov model process.

10. A subsurface data processing apparatus, comprising:
    a memory configured to store subsurface data and a knowledgebase for a machine learning process; and
    a processor configured to
    determine a set of clusters based at least in part on a set of measurement vectors associated with:
    multiple continuous or non-continuous depths comprised in the subsurface data, or
    different times in the subsurface data, wherein resolution data associated with the measurement vectors is used to determine an upper bound for the set of clusters and thereby quantify the set of clusters based on the determined upper bound;
    define the set of clusters by classes associated with a state model;
    validate at least one class comprised in the classes;
    reduce a quantity of the subsurface data based at least in part on the at least one validated class comprised in the classes; and
    store the reduced quantity of the subsurface data and classes with the state model in the knowledgebase for the machine learning process.

11. The apparatus of claim 10, wherein the processor is configured to reconstruct input data and validate the state model based at least in part on the reconstructed input data.

12. The apparatus of claim 10, wherein the processor is configured to receive new input data and apply the state model to the new input data.

13. The apparatus of claim 12, wherein the processor is configured to determine new predicted data based at least in part on a result of the state model applied to the new input data.

14. The apparatus of claim 12, further comprising after assignment of classes to the new input data, the processor is configured to store updated processing or interpretation parameters in the knowledgebase, and the processor is configured to apply the updated processing or interpretation parameters by classes to generate outputs automatically.

15. The apparatus of claim 10, wherein the processor is configured to determine the set of clusters based at least in part on a cross entropy clustering operation.

16. The apparatus of claim 15, wherein the processor is configured to perform a Gaussian mixture model process on an output of the cross entropy clustering operation.

17. The apparatus of claim 16, wherein the processor is configured to perform a hidden Markov model process on an output of the Gaussian mixture model process.

18. A method for subsurface data processing, comprising:
    determining a set of clusters based at least in part on measurement vectors associated with:
    multiple continuous or non-continuous depths comprised in the subsurface data, or
    different times in the subsurface data, wherein resolution data associated with the measurement vectors is used to determine an upper bound for the set of clusters and thereby quantify the set of clusters based on the determined upper bound;
    defining the set of clusters in the subsurface data by classes associated with a state model;
    identifying a first set of classes comprised in the classes based at least in part on the clusters;
    identifying a second set of classes comprised in the classes based at least in part on the measurement vectors;
    validating at least one class comprised in the first set of classes or the second set of classes;
    reducing a quantity of the subsurface data based at least in part on the at least one validated class comprised in the classes; and
    storing the reduced quantity of the subsurface data and classes with the state model in a training database for a machine learning process.

19. The method of claim 18, wherein the depths or times of the measurement vectors are continuous.

20. The method of claim 18, further comprising reconstructing input data and validating the state model based at least in part on the reconstructed input data.

21. The method of claim 18, further comprising receiving new input data and applying the state model to the new input data.

22. The method of claim 21, further comprising determining new predicted data based at least in part on a result of the state model applied to the new input data.

23. The method of claim 18, further comprising generating a visualization of:
  the at least one validated class comprised in the classes, the at least one validated class being associated with a depth comprised in the subsurface data, or
  the reduced quantity of the subsurface data.

24. The method of claim 18, wherein the determining the set of clusters includes a cross entropy clustering operation.

25. The method of claim 24, wherein an output of the cross entropy clustering operation is applied to a Gaussian mixture model process.

26. The method of claim 25, wherein an output of the Gaussian mixture model process is applied to a hidden Markov model process.

\* \* \* \* \*